United States Patent [19]
Szalwinski

[11] Patent Number: 5,926,809
[45] Date of Patent: Jul. 20, 1999

[54] TWO-TIER QUERY METHODOLOGY FOR A DATABASE

[75] Inventor: Bruce P. Szalwinski, Austin, Tex.

[73] Assignee: Advanced Micro Devices, Inc., Austin, Tex.

[21] Appl. No.: 08/920,414

[22] Filed: Aug. 29, 1997

[51] Int. Cl.[6] .................................................. G06F 17/30
[52] U.S. Cl. .................................. 707/3; 707/1; 707/207; 707/103; 345/152; 345/326; 345/339
[58] Field of Search ................................ 707/3, 201, 103, 707/1; 345/156, 326, 339

[56] References Cited

U.S. PATENT DOCUMENTS

| | | | |
|---|---|---|---|
| 5,418,888 | 5/1995 | Alden | 395/64 |
| 5,423,035 | 6/1995 | DePrez | 395/600 |
| 5,548,770 | 8/1996 | Bridges | 395/800 |
| 5,551,027 | 8/1996 | Choy et al. | 707/201 |
| 5,574,900 | 11/1996 | Huang et al. | 395/601 |
| 5,625,816 | 4/1997 | Burdick et al.. | 707/103 |
| 5,628,012 | 5/1997 | Libkin | 395/613 |
| 5,809,501 | 9/1998 | Noven | 707/7 |
| 5,818,447 | 10/1998 | Wolf et al. | 345/335 |

*Primary Examiner*—Paul R. Lintz
*Assistant Examiner*—Jean M. Corrielus
*Attorney, Agent, or Firm*—Skjerven, Morrill, MacPherson, Franklin & Friel, LLP

[57] ABSTRACT

The present invention discloses a system and method for identifying and retrieving data from a database in a computer system having at least two processors, a memory, and at least one non-volatile storage system and uses a query statement to identify data to be retrieved. The query predicates are classified into a first tier and a second tier, wherein the first tier query predicates relate to higher level data and the second tier query predicates relate to lower level data. The second tier query predicates are divided into two or more views of the lower level data. The first tier query predicates are applied against the higher level data to determine pointers to one or more particular views and the pointers are stored, for example, in a driving table. The second tier query predicates are applied against the particular views of the lower level data and the pointers and particular views of the lower level data are processed wherein data may be identified. The query statement, including the query predicates, is submitted identifying data to be retrieved. The data, as identified in the query statement, is retrieved from the lower level data based on the second tier query predicates and the pointers to the views of said lower level data. The pointers are stored, for example, in a driving table. The driving table and the particular views of the lower level data are processed, preferably, in parallel.

59 Claims, 4 Drawing Sheets

TWO-TIER QUERY METHODOLOGY FOR A DATABASE

BACKGROUND OF THE INVENTION

1. Field of the Invention

This invention relates to a system and method for improving identification and retrieval of data from a computer implemented database system, and more particularly to a system and method for identifying and retrieving data from a large engineering database.

2. Description of the Related Art

Database management systems support the definition, retrieval, and updating of data stored in a database. A relational database management system is a particular form of a database system where data is stored in a tabularized form. The database tables consist of sets of rows which share common characteristics. The database is physically stored as pages of data on nonvolatile storage devices such as direct access storage devices. An index can also be stored on direct access storage devices listing a directory for locating specific data which aids in the retrieval of that data. Structured query languages (SQL), a sequential language, has been developed for relational database systems to access the data in a database. A relational database allows a user to modify and access a database by specifying the relationship of two or more tables by writing an expression.

Computer programmers write application programs to access and maintain the data in the database. The application programs are executed by the database management system. The application programs need to be processed by the central processing unit (CPU) of the computer system for execution by the CPU. The SQL statements are extracted from the application program. The SQL statements are used to access the data from the database. SQL statements specify what data is wanted but not how to get the data. Typically, the relational database management system determines the optimal method for accessing and retrieving the requested data. A strategy is deemed optimal in terms of minimizing the resource utilization costs and time.

In order to improve relational database management system performance in evaluating and satisfying queries, it is desirable to exploit the inherent parallelism in multiple CPUs or I/O devices available in the compute system during execution. Parallelism can also be exploited by using multiple CPUs to evaluate the data according to criteria provided by a query, so that total CPU time is lowered. A more complex parallelism operation involves partitioning the query execution plan among CPUs and executing operations in parallel. The query optimizer needs to consider whether a parallel strategy should be invoked when determining the optimal strategy that minimizes CPU time and resource utilization costs.

An example of data stored in a relational database system is semiconductor manufacturing and engineering test data. One problem which arises in standard semiconductor manufacturing techniques is that the various processes take place at discrete locations. Thus it is difficult to track a semiconductor device through the fabrication process, from single crystal to finished product. Such tracking may be necessary for quality control purposes in order to determine the causes of production problems which may result in low yields or circuit defects. Some of the data regarding operating conditions during the fabrication process are intrinsic data, for example, lot numbers, device model numbers or the like. Other data may be extrinsic data, such as production test data, production conditions, or the like. In the various processes, the various lot numbers may be changed, thus making it difficult for a production engineer to track down and solve difficulties in the production process.

Through the production process, testing and manufacturing steps are performed, generating data for each semiconductor device. If a problem arises in the manufacture of the semiconductor device, the production engineer may wish to track the semiconductor devices to determine why the production problem existed and correct the problem before performing additional process steps or shipping the product to the consumer. Also, a consumer may require that each semiconductor device can be effectively traced at each step.

Therefore, there is a need to not only effectively track engineering and production data, but also to efficiently and timely retrieve required data. There is a significant time penalty for extracting large amounts of unit level data from large databases, such as, for example, an engineering database, on the order of forty-eight hours in some cases using a standard query generator. Unit level data includes an individual die before and during assembly and a packaged part after assembly. A unit level view of an engineering database can each combine over 15 tables of data in a very complicated join of all the tables to provide the desired look into the data for retrieval purposes. A massive number of nested loops are processed and data derived from the inner most tables must be successively restricted by data from the outer tables which can lead to a large data set carried from the inner tables to the outer tables and, hence the long query times. The process is also inherently single threaded and can not take advantage of parallel processing techniques. A query generator will also spend a considerable amount of time just determining an optimized plan for retrieving the data.

Another problem encountered in retrieving data from large databases is read consistency during query generation and retrieval of the data, such as, for example, with the Oracle™ database. The data to be retrieved should be the data present in the database at the time the query statement is entered and long running transactions must attempt to maintain a read consistent view of all tables. However, since there is continuous loading and archiving of existing data, it is often difficult to maintain a read consistent view of the data. For example, over time as data is loaded into the database, copies of old data are retained for a time in complex multiple rollback segments of the database with the data of interest in more than one segment. If the query generation is time consuming, then the data, from the time the query began, may no longer be in the rollback segments and therefore the resultant data is never retrieved.

One or more of the foregoing problems are overcome and one or more of the forgoing needs are satisfied by the present invention.

SUMMARY OF THE INVENTION

The present invention discloses a system and method for identifying and retrieving data from a database in a computer system having at least two processors, a memory, and at least one non-volatile storage system. Query predicates are classified into a first tier and a second tier, wherein the first tier query predicates relate to higher level data and the second tier query predicates relate to lower level data.

The second tier query predicates are divided into two or more views of the lower level data. The first tier query predicates are applied against the higher level data to determine limit information and pointers to one or more particular views and the limit information and the pointers are, for example, stored in a driving table. The second tier query predicates are applied against the particular views of the lower level data, and the pointers and particular views of the lower level data are processed wherein the data may be identified. The pointers stored, for example, in the driving table, and the particular views of the lower level data are, preferably, processed in parallel.

A query statement, including the query predicates, is used to identify data to be retrieved. The database is, for example, an engineering database having data related to the manufacturing and testing of semiconductor devices. The query statement is submitted, for example, by a user from a workstation. The data, as identified in the query statement, is retrieved from the lower level data based on the second tier query predicates and the pointers to the views of the lower level data.

The system and method of the present invention provides an efficient and reliable method for identifying and retrieving data from a database, such as, for example, a large engineering database, wherein the problems of read consistency and significant time consumption are solved.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
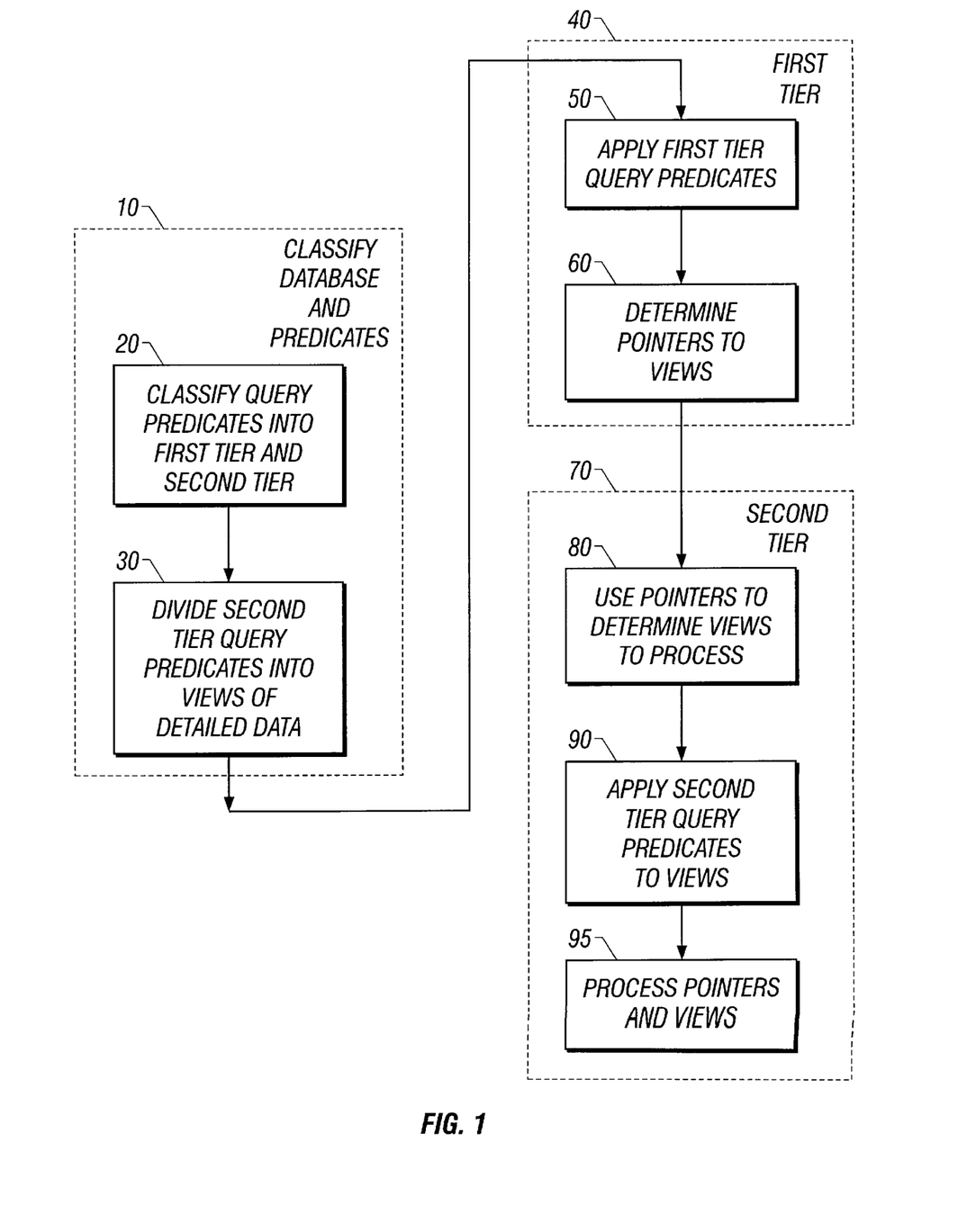
FIG. 1 is a flowchart illustrating the method of the present invention for identifying data in a database.

The flowchart of FIG. 1 illustrates the method of the present invention for identifying data in a database in a computer system. The computer system includes at least two processors, a memory, and at least one non-volatile storage system. Query predicates and the database are classified into two tiers in section 10. A query predicate is a term designating a property or relation to the data to be identified or retrieved. A tier is a logical representation of the tables within the database and within the structure of the tier the relationships between the tables are defined. The query predicates are classified, at block 20, into a first tier and a second tier, wherein the first tier query predicates relate to higher level data and the second tier query predicates relate to lower level data or the detailed data. The second tier query predicates are divided into two or more views of the lower level data per block 30.

In section 40 the higher level data relating to the first tier query predicates is processed. The first tier query predicates are applied against the higher level data per block 50 using, for example, application programs, such as the SQL generator. At block 60, pointers or keys to one or more views of the lower level data are determined.

In section 70 the particular views of the lower level data are processed. The pointers are used to determine particular views of the lower level data to process per block 80. At block 90, the second tier query predicates are applied to the particular views of lower level data. The pointers and the particular views of the lower level data are processed per block 95 wherein data may be identified from the lower level data based on the second tier query predicates and the pointers. The pointers and the particular views of the lower level data are, preferably, processed in parallel with, for example, Oracle's™ Parallel Query Technology™. When the first tier query predicates are applied against the higher level data, limit information may also be determined and stored in the driving table.

Figure 2:
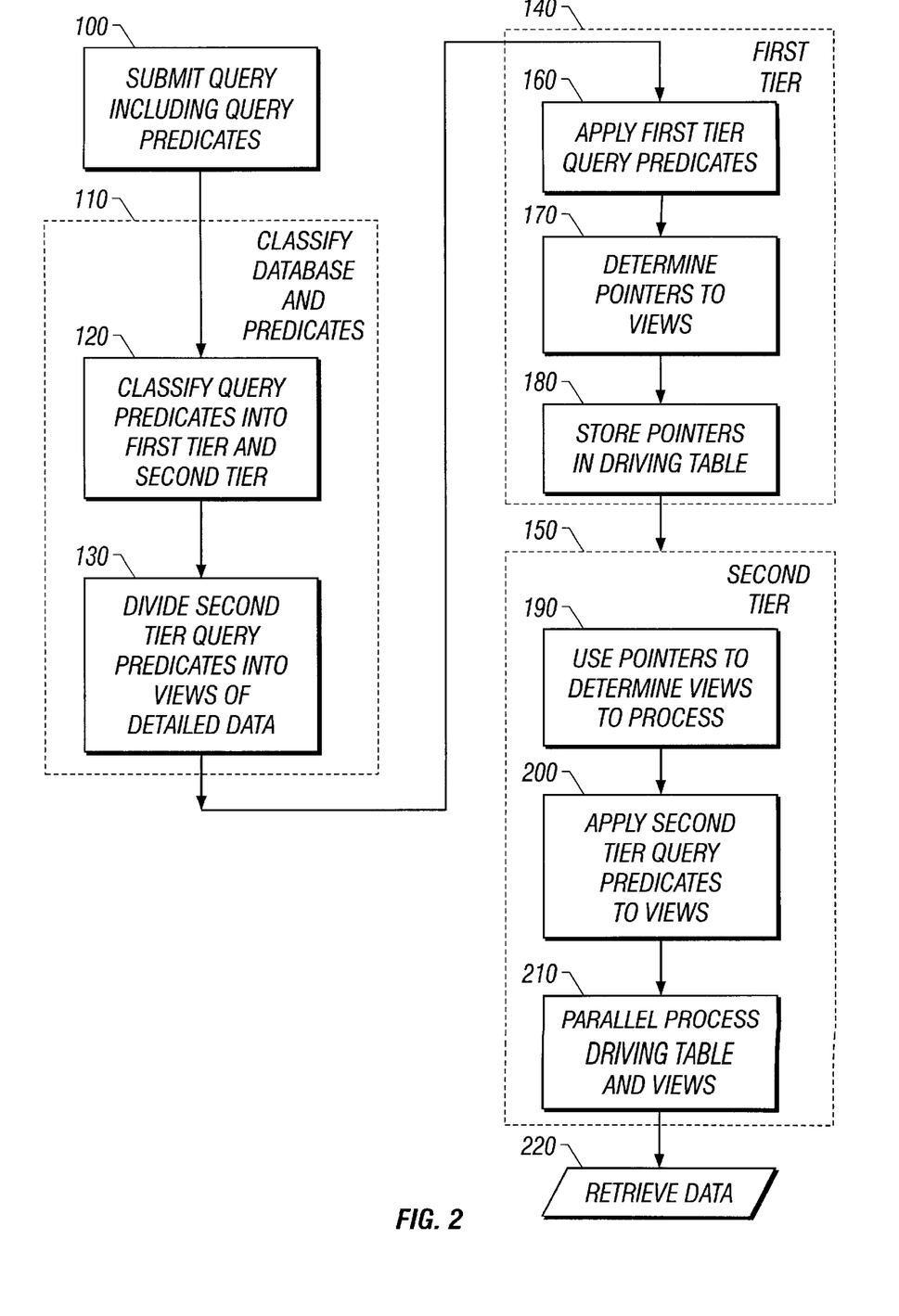
FIG. 2 is a flowchart illustrating the method of the present invention for identifying and retrieving data from a database.

The flowchart of FIG. 2 illustrates the method of the present invention for identifying and retrieving data from a database in a computer system. The computer system includes at least two processors, a memory, and at least one non-volatile storage system. At block 100, a user, from a user workstation or a personal computer, for example, submits a query statement identifying data to be retrieved. The query statement includes the query predicates. The query predicates and database are classified into two tiers in section 110. The query predicates are classified, at block 120, into a first tier and a second tier, wherein the first tier query predicates relate to the higher level data and the second tier query predicates relate to the lower level data. The second tier query predicates are divided into two or more views of the lower level data per block 130.

In section 140 the higher level data relating to the first tier query predicates is processed. The first tier query predicates are applied against the higher level data per block 160 using, for example, application programs, such as, for example, the SQL generator. At block 170, the pointers or keys to one or more views of the lower level data are determined and the pointers are stored, for instance, in the driving table per block 180.

In section 150 the particular views of the lower level data are processed. The pointers are used to determine the particular views of the lower level data to process per block 190. At block 200, the second tier query predicates are applied to the particular views of the lower level data. The pointers, for example, stored in the driving table, and the particular views of the lower level data are processed per block 210, preferably in parallel with, for example, Oracle's™ Parallel Query Technology™. The data is retrieved, per block 220, as identified in the query statement, from the lower level data based on the second tier query predicates and the pointers to the views of the lower level data. When the first tier query predicates are applied against the higher level data, the limit information may also be determined and stored in the driving table.

Figure 3:
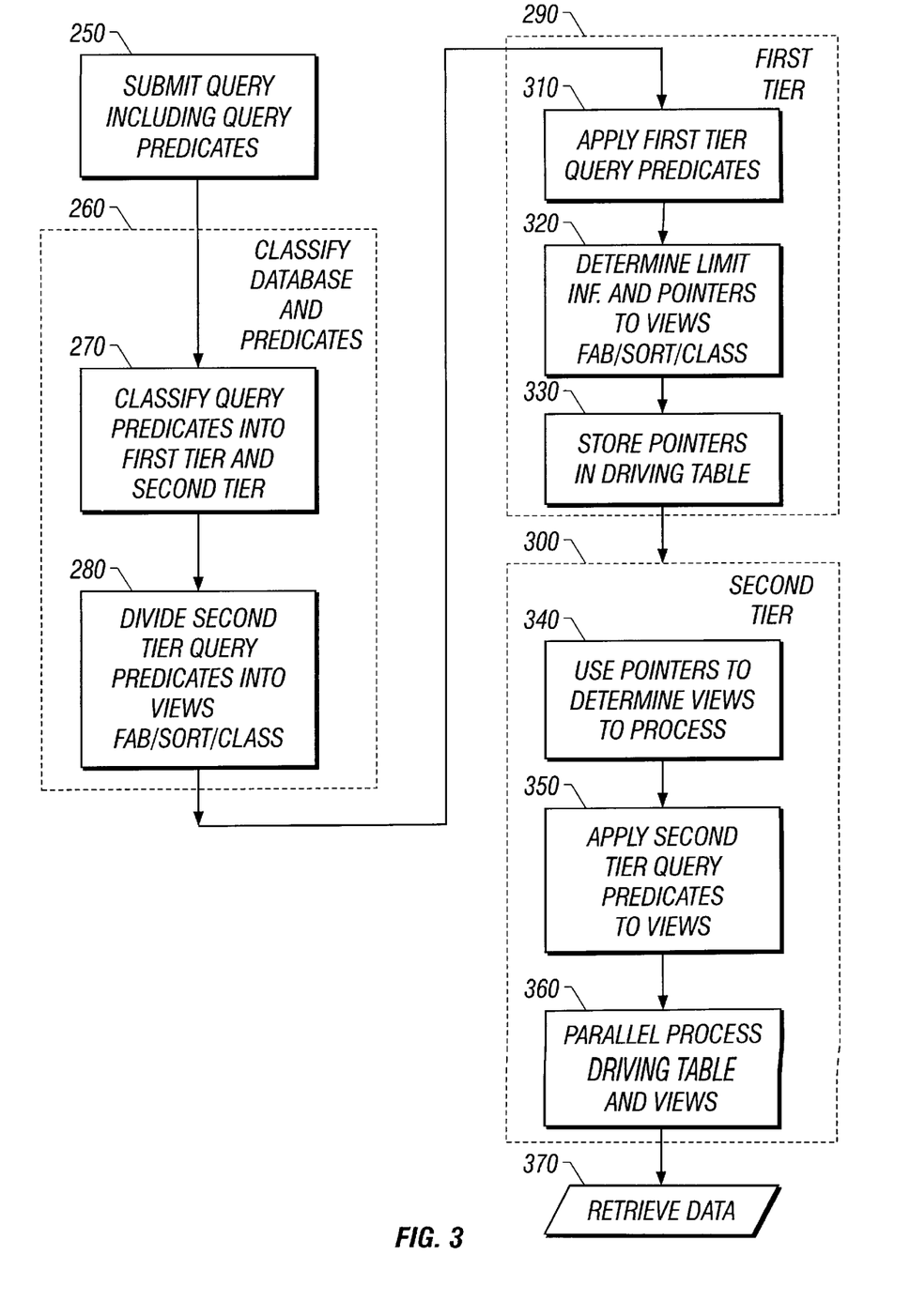
FIG. 3 is a flowchart illustrating an embodiment of the method of the present invention wherein the database is an engineering database related to the manufacturing of semiconductor devices.

Referring to FIG. 3, the method of the present invention is illustrated wherein the database is an engineering database related to the manufacturing and testing of semiconductor devices. As in FIG. 2, the query statement is submitted identifying data to be retrieved per block 250. The query predicates and database are classified into two tiers in section 260. The query predicates are classified, at block 270, into the first tier query predicates relating to the higher level data and the second tier query predicates relating to the lower level data. Therefore, all the columns that the user can filter are identified as either a first tier or a second tier query predicate. Preferably, an Oracle™ database table is used. The table includes, for example, tablename, columnname, tierlevel. At the time the query statement is submitted, this table would be consulted to determine whether the query predicate is a first tier query predicate or a second tier query predicate. Also, rather than registering individual columns, the table which stores the classification information registers the name of a view for each tier, for example, "viewtier1parameterunit" or "viewtier2parameterunitclass", and another table includes the information regarding the columns in the view. Therefore, if an additional column is added to a particular view, it is automatically known to which tier it belongs.

In an engineering database related to the manufacturing and testing of semiconductor devices, the higher level data and first tier query predicates include the following tables of terms:

testinsertion; lotteststatus; manufacturingarea; lothistory; manufacturingprocessstep; product; testrunsetup; configurationelement; equipmentandhardware; initial fabricationlot; lot; and, testlimits.

The second tier query predicates are divided into two or more views of the lower level data per block 280. The lower level detailed data and second tier query predicates include the following tables of terms:

fabanalogunitresults; sortanalogunitresults; classanalog unitresults; wafer; wafersummary; and, unit,     wherein the term "fab" relates to process data specific to a particular manufacturing facility, the term "sort" relates to process data and test data specific to a particular semiconductor product, and the term "class" relates to process data and test data specific to a particular packaged semiconductor device.

Therefore, the query building process is simplified wherein, in the embodiment illustrated in FIG. 3, four views related to parametric data are established including the following:

viewtier1parameterunit (wherein the limit information and pointers are determined); viewtier2parameterunit class; viewtier2parameterunitfab; viewtier2parameter unitsort.

The query building process also establishes two views (not illustrated) related to bin data including the following:

viewtier1bin; viewtier2binsort.

For example, an end user submits a query statement including lotidentification, manufacturingstep and site description. Both lotidentification and manufacturingstep are first tier query predicates because they are contained in the testinsertion and lothistory tables. Sitedescription is a second tier query predicate because it is contained in the unit table. When building the query to retrieve the data, lot identification, manufacturingstep would be applied in the query predicates for the first tier table. Only sitedescription would be supplied as a query predicate for the second tier table.

In section 290 the higher level data relating to the first tier query predicates is processed. The first tier query predicates are applied against the higher level data per block 310. At block 320, pointers or keys to one or more views (i.e. fab, sort or class) of the lower level data and the limit information are determined and, preferably, stored in the driving table per block 330. The driving table columns and terms are, for example:

testrunsurrogate key ("sk"); and testlimitsurrogate key ("sk").

Second tier type fields, such as wafernumber or x coordinate are not included in the driving table. The driving table applies all of the available first tier query predicates to build a top level view of the data. No detailed data is returned by the first tier query predicates, but rather pointers to the lower level data are stored via the testrunsk and test limitsk. The second tier query predicates will take advantage of these pointers. The limit information is also captured at this higher level data rather than being duplicated for every row in the lower level detailed data tables. This reduces the amount of time needed to construct the limit file. The limit information includes data relating to the bounds of results expected during a particular testing and includes a lengthy description of a parameter name.

In section 300 the particular views of the lower level data are processed. The pointers are used to determine particular views of the lower level data to process per block 340. At block 350, the second tier query predicates are applied to the particular views of lower level data. The driving table, including the pointers and limit information, and the particular views of the lower level detailed data are processed, preferably in parallel, per block 360 with, for example, Oracle's™ Parallel Query Technology™. The data is retrieved, per block 370, as identified in the query statement, from the lower level data based on the second tier query predicates and the pointers to the views of the lower level data.

The creation of the first tier driving table provides advantages in the speed and processing of a query statement. A majority of the predicates supplied by the user only narrow the high level information, for example, lots, products, technologies, dates, and manufacturing areas. By using these predicates to build one or more driving tables, the query statement or request does not have to maintain a long running read consistent view of the data. The building of the first tier table driving table, for example, in an engineering database, can take as little as five seconds to four minutes depending on the information requested.

The second half of the two-tier query methodology uses the pointers stored, for instance, in the driving table plus one of the three unit level views described and is processed, preferably in parallel. This feature allows for multiple processors to participate in finding the detailed data, thus retrieving the data significantly faster than a single processor. The first tier driving table is fully scanned during this process. The detailed data can be retrieved, for example, from an engineering database, at a maximum rate of 1.58M Rows/hour and a minimum rate of 0.8M Rows/hour. Another advantage is that a significantly smaller table is built from which to derive limit information. The first tier driving table can be built to contain a complete list of limit information.

With the first tier table as the driving table, it is possible to take advantage of parallel processing, such as for example, with the Oracle™ parallel query technology. The testrunsk and the testlimitsk columns from the driving table are used to drive the second tier query predicates allowing the query statement to quickly access the unit level data via primary keys or pointers.

Figure 4:
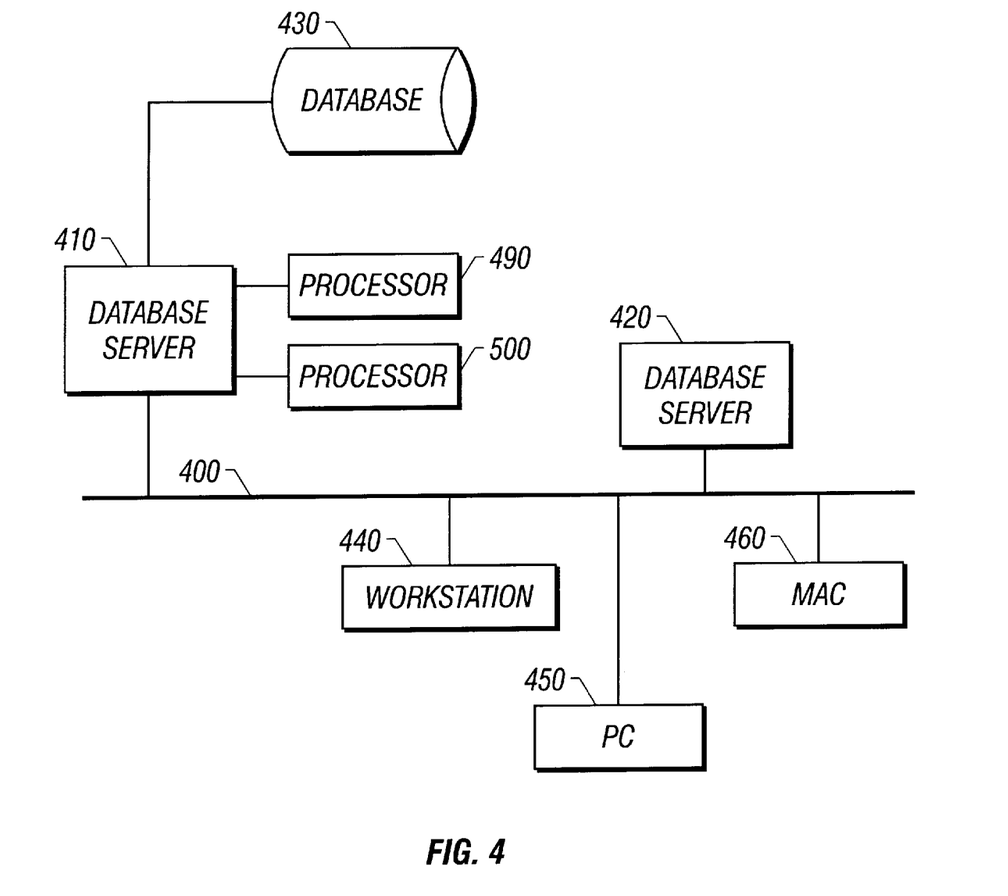
FIG. 4 is a block diagram of the system of the present invention for identifying and retrieving data from a database in a computer system.

FIG. 4 is a block diagram illustrating the system of the present invention for identifying and retrieving data from an engineering database in a computer system related to the manufacturing and testing of semiconductor devices. In FIG. 4, the database system is composed of various distributed elements connected together by a common network designated as a worldnet network 400. Worldnet network 400 may comprise, for example, any of many known computer system networks which may be accessed via telephone link, microwave relay, satellite link or the like. Worldnet network 400 preferably provides a data link throughout the world or may comprise a network more limited in scope.

A plurality of database servers 410, 420 may be provided. For the purposes of illustration, local database server 410 represents a database server for a particular location, whereas database server 420 represents all other database servers within the database management system logically joined and connected through the worldnet network 400. Typically, each data source (e.g., manufacturing plant or testing facility) may be provided with one or more database servers 420. However, the database system may also be a centralized database system with a single database server.

Access to database 430 is provided through one of a number of clients located on worldnet network 400 for serving end users. The term "end user" as used herein, refers to a production engineer or the like using information in the database system. The client may take the form of a graphical user interface (GUI) program which allows access to the database 430 as provided in an IBM™ compatible personal computer 450, an Apple™ MacIntosh™ computer 460, or UNIX™ Workstation 440 coupled to worldnet network 400. Database servers 410, 420 may operate using, preferably, the Oracle™ relational database management software, or the like, which provides an operating system and search software for database servers 410, 420.

The software structure and data flow between the client and the database servers is described below. The client, may comprise, for example, PC 450, however, client 450 may also be substituted by clients 460 and 440 without departing from the spirit or the scope of the invention. Client 450 may contain a package of software programs which cooperate to provide a GUI for end user requests and query statements. For example, PC-NFS, a product of SUN Microsystems, comprises a software package which allows a DOS based PC to operate as a UNIX™ Workstation. The classifications of the first tier and second tier query predicates are registered by and end user and stored in a library software program, such as, the Oracle™ relational database management software, which provides for searching the stored classifications of the query predicates. The system of the present invention divides the second tier query predicates into views of the lower level data.

A sequential language application program, such as, for example, the SQL generator provides access to the database when applying the first tier and second tier query predicates and determining the views necessary to retrieve the detailed data. To enter a request or query statement, the client 450 creates a query request file using information entered by the end user through the GUI. The query request file includes the name of the query definition file which contains the logical search request. The query request file also includes the destination environment and node (i.e., format and file location). Multiple processors 490, 500 are coupled, for example, to a database server 410 to accommodate the parallel processing for the data retrieval.

The foregoing has described a system and methodology which provides an efficient and effective capability for retrieving data from a database, especially from large engineering databases related to the manufacturing and testing of semiconductor devices. This system and methodology has the advantage of significantly reducing time consumption of computer resources and effectively solves the problem of read consistency in retrieval of data.

Other embodiments are within the following claims and while only certain preferred features of the invention have been shown by way of illustration, many modifications and changes will occur. For example, the various software structures may be modified or replaced with comparable software to maximize ease of use or to minimize power consumption. Also for example, while the preferred embodiment is set forth as software, it is anticipated that the invention could be implemented in hardware such as an application specific integrated circuit. It is, therefore, to be understood that the present claims are intended to cover all such modifications and changes which fall within the true spirit of the invention.

What is claimed is:

1. A method for identifying data in a database in a computer system, the computer system including at least two processors, a memory, and at least one non-volatile storage system, comprising the steps of:

classifying query predicates into a first tier and a second tier, wherein the first tier query predicates relate to higher level data and the second tier query predicates relate to lower level data;

dividing at least one of the second tier query predicates into two or more views of said lower level data such that at least one set of lower level data views appropriate to the at least one of the second tier query predicates is selected;

applying at least one of the first tier query predicates against the higher level data to determine one or more pointers to one or more particular lower level data views;

applying the at least one of the second tier query predicates against at least one lower level data view selected from the at least one set of lower level data views appropriate to the at least one of the second tier query predicates; and processing the one or more pointers and the at least one lower level data view selected from the at least one set of lower level data views appropriate to the at least one of the second tier query predicates.

2. A method, as recited in claim 1, further comprising:

submitting a query statement including the query predicates identifying data to be retrieved.

3. A method, as recited in claim 2, said processing further comprising:

retrieving the data, as identified in the query statement, from the lower level data based on at least one of the second tier query predicates and the one or more pointers to one or more particular lower level data views.

4. A method, as recited in claim 2, wherein the query statement is submitted by a user from a user workstation.

5. A method, as recited in claim 2, wherein the query statement is submitted by a user from a personal computer.

6. A method, as recited in claim 1, said processing further comprising:

processing the one or more pointers and the at least one lower level data view selected from the at least one set of lower level data views appropriate to the at least one of the second tier query predicates in parallel.

7. A method, as recited in claim 1, said applying at least one of the first tier query predicates further comprising:

storing the one or more pointers in a driving table.

8. A method, as recited in claim 7, said processing further comprising:

processing the driving table and the at least one lower level data view selected from the at least one set of lower level data views appropriate to the at least one of the second tier query predicates in parallel.

9. A method, as recited in claim 1, wherein the query predicates are first classified by an end user and stored in the computer system, wherein a first table stores names of the first tier and second tier query predicates and a second table stores information related to columns in each view in the first tier and second tier query predicates, and wherein, when a column is added to the classifications, the added column is automatically classified.

10. A method, as recited in claim 1, said applying at least one of the first tier query predicates further comprising:

determining limit information when the at least one of the first tier query predicates is applied against the higher level data.

11. A method, as recited in claim 10, said determining limit information when the at least one of the first tier query predicates is applied against the higher level data further comprising:

storing the limit information in a driving table.

12. A method, as recited in claim 1, wherein the database is an engineering database system having data related to the manufacturing and testing of semiconductor devices.

13. A method for identifying and retrieving data from an engineering database in a computer system having data related to the manufacturing and testing of semiconductor devices, the computer system including at least two processors, a memory, and at least one non-volatile storage system, comprising the steps of:

submitting a query statement including query predicates identifying data to be retrieved;

classifying the query predicates into a first tier and a second tier, wherein the first tier query predicates relate to higher level data and the second tier query predicates relate to lower level data;

dividing at least one of the second tier query predicates into two or more views of said lower level data such that at least one lower level data view appropriate to the at least one of the second tier query predicates is selected;

applying at least one of the first tier query predicates against the higher level data to determine one or more pointers to one or more particular lower level data views;

storing the pointers in a driving table;

processing the driving table and the at least one lower level data view appropriate to the at least one of the second tier query predicates in parallel; and retrieving the data, as identified in the query statement, from the lower level data based on the at least one of the second tier query predicates and the one or more pointers to the views of said lower level data.

14. A method, as recited in claim 13, said applying at least one of the first tier query predicates further comprising:

determining limit information when the at least one of the first tier query predicates is applied against the higher level data.

15. A method, as recited in claim 14, said determining limit information further comprising:

storing the limit information in the driving table.

16. A method, as recited in claim 13, wherein one view of the two or more views of said lower level data includes process data specific to a particular manufacturing facility.

17. A method, as recited in claim 13, wherein one view of the two or more views of said lower level data includes process data and test data specific to a particular semiconductor product.

18. A method, as recited in claim 13, wherein one view of the two or more views of said lower level data includes process data and test data specific to a particular packaged semiconductor device.

19. A method, as recited in claim 13, wherein the query predicates are first classified by an end user and stored in the computer system, wherein a first table stores names of the first tier and second tier query predicates and a second table stores information related to columns in each view in the first tier and second tier query predicates, and wherein, when a column is added to the classifications, the added column is automatically classified.

20. A method, as recited in claim 13, wherein the query statement is submitted by a user from a user workstation.

21. A method, as recited in claim 13, wherein the query statement is submitted by a user from a personal computer.

22. A system for identifying data in a database in a computer system, the computer system including at least two processors, a memory, and at least one non-volatile storage system, comprising:

means for classifying query predicates into a first tier and a second tier, wherein the first tier query predicates relate to higher level data and the second tier query predicates relate to lower level data;

means for dividing at least one of the second tier query predicates into two or more views of said lower level data such that at least one set of lower level data views appropriate to the at least one of the second tier query predicates is selected;

means for applying at least one of the first tier query predicates against the higher level data to determine one or more pointers to one or more particular lower level data views;

means for applying the at least one of the second tier query predicates against at least one lower level data view selected from the at least one set of lower level data views appropriate to the at least one of the second tier query predicates; and means for processing the one or more pointers and the least one lower level data view selected from the at least one set of lower level data views appropriate to the at least one of the second tier query predicates.

23. A system, as recited in claim 22, further comprising:

means for submitting a query statement including the query predicates identifying data to be retrieved.

24. A system, as recited in claim 23, said means for processing further comprising:

means for retrieving the data, as identified in the query statement, from the lower level data based on the second tier query predicates and the one or more pointers to one or more particular lower level data views.

25. A system, as recited in claim 23, wherein the means for submitting a query statement includes a user submitting the query statement from a user workstation.

26. A system, as recited in claim 23, wherein the means for submitting a query statement includes a user submitting the query statement from a personal computer.

27. A system, as recited in claim 22, said means for processing further comprising:

means for processing the one or more pointers and the least one lower level data view selected from the at least one set of lower level data views appropriate to the at least one of the second tier query predicates in parallel.

28. A system, as recited in claim 22, said means for applying at least one of the first tier query predicates further comprising:

means for storing the pointers in a driving table.

29. A system, as recited in claim 28, said means for processing further comprising:

means for processing the driving table and the least one lower level data view selected from the at least one set of lower level data views appropriate to the at least one of the second tier query predicates in parallel.

30. A system, as recited in claim 22, wherein the means for classifying further includes first classifying the query predicates by an end user and storing the classifications in the computer system, wherein a first table stores names of the first tier and second tier query predicates and a second table stores information related to columns in each view in the first tier and second tier query predicates, and wherein, when a column is added to the classifications, the added column is automatically classified.

31. A system, as recited in claim 22, said means for applying at least one of the first tier query predicates further comprising:
means for determining limit information when the at least one of the first tier query predicates is applied against the higher level data.

32. A system, as recited in claim 31, said means for determining limit information further comprising:
means for storing the limit information in a driving table.

33. A system, as recited in claim 22, wherein the database is an engineering database system having data related to the manufacturing and testing of semiconductor devices.

34. A system, as recited in claim 22, wherein the database includes two or more databases located in separate locations and two or more database servers.

35. A system, as recited in claim 22, wherein the database includes a centralized database and a database server.

36. A method of manufacturing a semiconductor device, comprising the steps of:
processing and testing a semiconductor material in a series of steps to form a semiconductor device;
collecting and storing process data and test data from one or more of said processing and testing steps in a computerized database system having at least one processor, a memory, and at least one non-volatile storage system;
classifying query predicates into a first tier and a second tier, wherein the first tier query predicates relate to higher level data and the second tier query predicates relate to lower level data;
dividing at least one of the second tier query predicates into two or more views of said lower level data such that at least one lower level data view appropriate to the at least one of the second tier query predicates is selected;
applying at least one of the first tier query predicates against the higher level data to determine one or more pointers to one or more particular lower level data views; and
processing the one or more pointers and the at least one lower level data view appropriate to at least one of the second tier query predicates.

37. A method, as recited in claim 36, further comprising:
submitting a query statement to said computerized database system including the query predicates identifying data to be retrieved.

38. A method, as recited in claim 37, said processing further comprising:
retrieving the data, as identified in the query statement, from the lower level data based on at least one of the second tier query predicates and the one or more pointers to one or more particular lower level data views.

39. A method, as recited in claim 37, wherein the query statement is submitted by a user from a user workstation.

40. A method, as recited in claim 37, wherein the query statement is submitted by a user from a personal computer.

41. A method, as recited in claim 36, said processing further comprising:
processing the one or more pointers and the at least one lower level data view appropriate to the at least one of the second tier query predicates in parallel.

42. A method, as recited in claim 36, said applying at least one of the first tier query predicates further comprising:
storing the one or more pointers in a driving table; and
processing the driving table and the at least one lower level data view appropriate to the at least one of the second tier query predicates in parallel.

43. A method, as recited in claim 36, wherein the query predicates are first classified by an end user and stored in the computerized database system, wherein a first table stores names of the first tier and second tier query predicates and a second table stores information related to columns in each view in the first tier and second tier query predicates, and wherein, when a column is added to the classifications, the added column is automatically classified.

44. A method, as recited in claim 36, said applying at least one of the first tier query predicates further comprising:
determining limit information when the at least one of the first tier query predicates is applied against the higher level data; and
storing the limit information in a driving table.

45. A method, as recited in claim 36, wherein one view of the two or more views of said lower level data includes process data specific to a particular manufacturing facility.

46. A method, as recited in claim 36, wherein one view of the two or more views of said lower level data includes process data and test data specific to a particular semiconductor product.

47. A method, as recited in claim 36, wherein one view of the two or more views of said lower level data includes process data and test data specific to a particular packaged semiconductor device.

48. A method, as recited in claim 36, wherein the computerized database system includes two or more databases located in separate locations and two or more database servers.

49. A method, as recited in claim 36, wherein the computerized database system includes a centralized database and a database server.

50. A program product stored on a computer readable medium, executable by a processor, comprising:
a method for identifying data in a database in a computer system, the computer system including at least two processors, a memory, and at least one non-volatile storage system, the method comprising the steps of:
classifying query predicates into a first tier and a second tier, wherein the first tier query predicates relate to higher level data and the second tier query predicates relate to lower level data;
dividing at least one of the second tier query predicates into two or more views of said lower level data such that at least one set of lower level data views appropriate to the at least one of the second tier query predicates is selected;
applying at least one of the first tier query predicates against the higher level data to determine one or more pointers to one or more particular lower level data views;

applying the at least one of the second tier query predicates against at least one lower level data view selected from the at least one set of lower level data view appropriate to the at least one of the second tier query predicates; and processing the one or more pointers and the at least one lower level data view selected from the at least one set of lower level data view appropriate to the at least one of the second tier query predicates.

51. A program product, as recited in claim 50, wherein the method for identifying data further comprises:

submitting a query statement including the query predicates identifying data to be retrieved.

52. A program product, as recited in claim 51, wherein said processing the one or more pointers further comprises:

retrieving the data, as identified in the query statement, from the lower level data based on the second tier query predicates and the one or more pointers to one or more particular lower level data views.

53. A program product, as recited in claim 51, wherein the query statement is submitted by a user from a user workstation.

54. A program product, as recited in claim 51, wherein the query statement is submitted by a user from a personal computer.

55. A program product, as recited in claim 50, wherein said processing the one or more pointers further comprises:

processing the one or more pointers and the at least one lower level data view selected from the at least one set of lower level data view appropriate to the at least one of the second tier query predicates in parallel.

56. A program product, as recited in claim 50, wherein said applying at least one of the first tier query predicates further comprises:

storing the one or more pointers in a driving table; and processing the driving table and the at least one lower level data view selected from the at least one set of lower level data view appropriate to the at least one of the second tier query predicates in parallel.

57. A program product, as recited in claim 50, wherein the query predicates are first classified by an end user and stored, wherein a first table stores names of the first tier and second tier query predicates and a second table stores information related to columns in each view in the first tier and second tier query predicates, and wherein, when a column is added to the classifications, the added column is automatically classified.

58. A program product, as recited in claim 50, wherein said applying at least one of the first tier query predicates further comprises:

determining limit information when the at least one of the first tier query predicates is applied against the higher level data; and storing the limit information in a driving table.

59. A program product, as recited in claim 50, wherein the database is an engineering database system having data related to the manufacturing and testing of semiconductor devices.

* * * * *